UNITED STATES PATENT OFFICE.

THOMAS J. BARRON, OF BROOKLYN, NEW YORK.

IMPROVEMENT IN WATER AND DRAIN PIPES.

Specification forming part of Letters Patent No. 114,904, dated May 16, 1871.

*To all whom it may concern:*

Be it known that I, THOMAS J. BARRON, of Brooklyn, in the county of Kings and State of New York, have invented a new and valuable Improvement in Water and Drain Pipes; and I do hereby declare that the following is a full, clear, and exact description of the same.

My invention relates to the manufacture of drain and water pipes, and consists in the construction of such pipe of the materials and by the process hereinafter described, to wit:

I take any coarse, cheap, or waste material, such as cinders, ashes, gravel, or sand, that may be sufficiently hard and substantial, and mix the same with hydrocarbons, either fluid or solid, so as to form a proper compost for the purpose required. In order to form this compost so as to secure a perfect union of the substances I place all the materials used under a heat ranging from 400° to 600° Fahrenheit. I then gradually stir the compost until it becomes a stiff mortar adapted for molding into pipes, tubes, or other article I desire to manufacture.

After the mortar is thus formed I mold it into the shape desired and place it in an oven, when it is subjected to such heat as will drive off the volatile portions thereof and fix the carbon as cement.

After the core or body of the pipe or other article is thus formed it presents the appearance of a porous tube or mass, usually too porous and weak for ordinary use. To perfect it, by closing its pores and adding to its strength, I immerse it in a liquid formed of hot melted asphaltum. When this is done the article is ready for use.

I sometimes form the body of the article being manufactured of the coarse or waste material above mentioned and a solution of any soluble silicate. When this is done I apply the coating of asphaltum in the manner specified.

I claim as my invention—

1. A water pipe or other article the body of which is formed of the materials and by the means described, and afterward coated with asphaltum or its equivalent, substantially as specified.

2. The process herein described of manufacturing useful articles of the materials mentioned.

In testimony that I claim the above I have hereunto subscribed my name in the presence of two witnesses.

THOS. J. BARRON.

Witnesses:
F. B. CURTIS,
CHAS. M. KANOUSE.